(12) United States Patent
Wang et al.

(10) Patent No.: US 10,903,553 B2
(45) Date of Patent: Jan. 26, 2021

(54) DISPLAY DEVICE WITH INTEGRATED ANTENNA

(71) Applicant: Google LLC, Mountain View, CA (US)

(72) Inventors: Zheyu Wang, San Jose, CA (US); Jiang Zhu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/654,129

(22) Filed: Oct. 16, 2019

(65) Prior Publication Data

US 2020/0411969 A1 Dec. 31, 2020

Related U.S. Application Data

(60) Provisional application No. 62/867,305, filed on Jun. 27, 2019.

(51) Int. Cl.
*H01Q 1/27* (2006.01)
*H04B 1/3827* (2015.01)
*H01Q 5/20* (2015.01)
*H01Q 5/50* (2015.01)
*H01Q 21/00* (2006.01)

(52) U.S. Cl.
CPC ............ *H01Q 1/273* (2013.01); *H01Q 5/20* (2015.01); *H01Q 5/50* (2015.01); *H01Q 21/0087* (2013.01); *H04B 1/385* (2013.01)

(58) Field of Classification Search
CPC ............ H01Q 1/273; H01Q 5/20; H01Q 5/50; H01Q 21/0087; H04B 1/385
See application file for complete search history.

(56) References Cited

U.S. PATENT DOCUMENTS

| 9,444,141 | B2* | 9/2016 | Asrani | H01Q 1/243 |
|---|---|---|---|---|
| 2008/0275327 | A1* | 11/2008 | Faarbaek | A61B 5/411 600/382 |
| 2013/0230094 | A1* | 9/2013 | Eliezer | H01Q 21/29 375/238 |
| 2015/0351292 | A1* | 12/2015 | Chang | H05K 9/0075 361/749 |
| 2018/0026341 | A1* | 1/2018 | Mow | H04B 10/90 343/702 |
| 2018/0048058 | A1* | 2/2018 | Ehman | H01O 1/48 |
| 2018/0062245 | A1* | 3/2018 | Wu | H01Q 1/243 |
| 2018/0069588 | A1* | 3/2018 | Jiang | H04B 1/40 |
| 2020/0194905 | A1* | 6/2020 | Wei | A61B 5/0006 |

* cited by examiner

*Primary Examiner* — Nguyen T Vo
(74) *Attorney, Agent, or Firm* — Lerner, David, Littenberg, Krumholz & Mentlik, LLP (57) ABSTRACT

An antenna is provided for a personal computing device, for example a wearable device such as a smartwatch. The antenna includes one or more radiating elements configured to receive or transmit radio waves. For example, the one or more radiating elements may at least partially be formed by one or more components of a display of a device, where the one or more components of the display include one or more conductive elements. The one or more radiating elements may also at least partially be formed by a dedicated antenna layer positioned in the display of the device.

20 Claims, 9 Drawing Sheets

DISPLAY DEVICE WITH INTEGRATED ANTENNA

CROSS-REFERENCE TO RELATED APPLICATIONS

This application claims the benefit of the filing date of U.S. Provisional Patent Application No. 62/867,305 filed Jun. 27, 2019, the disclosure of which is hereby incorporated herein by reference.

BACKGROUND

Electronic devices include one or more antennas for transmitting and receiving signals in various communication bands. Antenna design for small electronic devices, such as portable electronic devices and wearable devices, can be challenging because of the constrained form factors of such devices. For example, while a smart phone may have limited space for housing its antennas, a smartwatch with a compact form factor may have even less space. The limited space may restrict various dimensions that impact antenna performance, such as dimensions of an antenna's radiating element, ground plane, and clearance distances to the ground plane and to other antennas. Further, antenna performance for wearable devices may be severely impacted by body effects due to the close proximity to the wearer, which may cause detuning, attenuation, and shadowing of the antenna.

Electronic devices may include one or more displays for presenting information and graphics to a user. For example, such a display may be a screen or a touch screen. The display may include various electronic, optical, and mechanical components.

BRIEF SUMMARY

The present disclosure provides for an antenna comprising one or more radiating elements. The one or more radiating elements are at least partially formed by one or more components of a display of a device, the one or more components of the display including one or more conductive elements; and a dedicated antenna layer positioned in the display of the device. The one or more radiating elements are configured to receive and/or transmit radio frequency waves.

The one or more radiating elements may be planar in shape. The one or more components and the dedicated antenna layer may be arranged in a layered stack.

The antenna may further comprise at least one separation layer positioned between the one or more components and the dedicated antenna layer such that the one or more conductive elements and the dedicated antenna layer are capacitively coupled through the at least one separation layer. The at least one separation layer may include an adhesive material.

The antenna may further comprise one or more tuners configured to change a resonant frequency of the antenna.

The antenna may further comprise one or more matching networks configured to change an impedance of a radio source or a load of the antenna.

The present disclosure further provides for a device, comprising a display and a first antenna. The first antenna comprising one or more radiating elements. The one or more radiating elements are at least partially formed by one or more components of the display, the one or more components of the display including one or more conductive elements; and a dedicated antenna layer positioned in the display. The one or more radiating elements are configured to receive and/or transmit radio frequency waves.

The one or more components of the display may include a display flex that provides electrical connections between the display to other components of the device.

The one or more conductive elements may include the electrical connections of the display flex. The one or more conductive elements may include a conductive coating on the display flex.

The dedicated antenna layer may be embedded in an adhesive layer in the display.

The device may further comprise at least one separation layer positioned between the one or more components and the dedicated antenna layer such that the one or more conductive elements and the dedicated antenna layer are capacitively coupled through the at least one separation layer. The separation layer may be an adhesive affixing the dedicated antenna layer to the one or more components of the display.

The device may further comprise a display cover, the display cover being made of a dielectric material configured to dielectrically load the first antenna.

The device may further comprise one or more display panels, the one or more display panels being made of a dielectric material configured to dielectrically load the first antenna.

The device may further comprise a housing, the housing is made of a conductive material; and a ground connection between the first antenna and the housing.

The device may further comprise a second antenna positioned along a periphery of a housing of the device, wherein the second antenna is configured to receive and/or transmit radio frequency waves in frequency ranges for GPS signals.

The device may further comprise a third antenna positioned along a periphery of a housing of the device, wherein the third antenna is configured to receive and/or transmit radio frequency waves in frequency ranges for WiFi and Bluetooth signals.

The present disclosure still further provides for a first antenna, a second antenna, and a third antenna. The first antenna includes one or more radiating elements, the one or more radiating elements being at least partially formed by one or more components of a display of a device, the one or more components of the display including one or more conductive elements, and a dedicated antenna layer positioned in the display of the device. The first antenna may be configured to receive and/or transmit radio frequency waves in frequency ranges for LTE signals. The second antenna may be positioned along a periphery of a housing of the device, the second antenna being configured to receive and/or transmit radio frequency waves in frequency ranges for GPS signals. The third antenna may be positioned along the periphery of the housing of the device, the third antenna may be configured to receive and/or transmit radio frequency waves in frequency ranges for WiFi and Bluetooth signals.

DETAILED DESCRIPTION

Overview

The present disclosure generally relates to a display antenna. For instance, a device, such as a small form factor wearable device (e.g., smartwatch), may include a housing, a display cover attached to the housing, and a display for presenting information to a user. The device may further include one or more antennas configured to receive and/or transmit radio frequency waves for wireless communication. However, as described above, antenna design in such a small form factor device can be challenging because dimensions and orientations of the antenna and other components are restricted by the size of the device, which may negatively impact antenna performance. In the case of wearable devices, antenna performance may also be negatively impacted by body effects of a wearer.

To resolve these issues, one of the antennas in the device may be configured as a display antenna that is at least partially formed by one or more components of the display. For instance, one or more radiating elements of the display antenna configured to transmit and/or receive radio frequency waves may at least partially be formed by one or more components of the display. As an example, a display flex may include conductive elements, such as metallic wirings and traces that provide electrical connections between the display and other components of the device. As such, the display flex may at least partially form the one or more radiating elements of the display antenna.

Further, the one or more radiating elements of the display antenna may also at least partially be formed by a dedicated antenna layer positioned in the display of the device. For example, the dedicated antenna layer may be a metallic layer coated on the display flex, or a metallic layer coated onto or embedded into an adhesive layer affixed to the display flex. Aspects of the dedicated antenna layer, such as dimensions and materials, can be adjusted to enhance antenna performance without impacting functions of the display.

To form parts of the same display antenna, the one or more components of the display and the dedicated antenna layer may be coupled together. For example, a separation layer, such as a dielectric adhesive, may be positioned between the one or more components of the display and the dedicated antenna layer to capacitively couple the one or more components of the display to the dedicated antenna layer. As another example, where the dedicated antenna layer is embedded into an adhesive layer, the adhesive layer may be the separation layer that capacitively couples the dedicated antenna layer to the one or more components of the display.

The one or more radiating elements of the display antenna may be planar in shape. For example, the one or more radiating elements of the display antenna may be configured to have a similar shape as the display. Such a configuration may allow the radiating elements to have a large surface area, which may improve antenna performance. The planar radiating elements may be arranged in a layered stack within the housing beneath the display cover.

In such a layered stack arrangement, the display antenna may be configured to be dielectrically loaded, which may further enhance antenna performance. For example, radio frequency waves may be received at the display cover, which may be made of a dielectric material such as glass, and subsequently loaded to the display antenna. Components such as one or more display panels made of a dielectric material (e.g., LCD glass panels), polarizers, adhesives, etc., may also be configured to dielectrically load the display antenna.

The device may include other antennas in addition to the display antenna. In this regard, the antennas may be configured to transmit and/or receive radio frequency signals in different frequency ranges. For example, the display antenna may be configured to receive and/or transmit radio frequency waves in frequency ranges for LTE signals. A second antenna may be configured to receive and/or transmit radio frequency waves in frequency ranges for GPS signals. A third antenna may be configured to receive and/or transmit radio frequency waves in frequency ranges for WiFi and Bluetooth signals.

The display antenna and antenna system as described herein provide for efficient operation of devices, particularly for small factor wearable electronic devices. Features of the display antenna provide for using conductive components that already exist in a display for forming antenna radiating elements, therefore saving limited space in small factor devices. A dedicated antenna layer in the display antenna provides flexibility for both antenna design and device design, for example, adjustments can be made to the dedicated antenna layer to change characteristics of the display antenna, instead of compromising dimensions and/or materials used in the display. The display antenna may be positioned to allow dielectric loading by dielectric components that already exist in the display, which may further improve antenna performance by effectively increasing the display antenna's electrical length without increasing its physical length. Features of the display antenna also provide for reduced coupling with other antennas, greater isolation from the body effects of the user, and reduced exposure of a user's body to RF radiation.

Example Systems

Figure 1A:
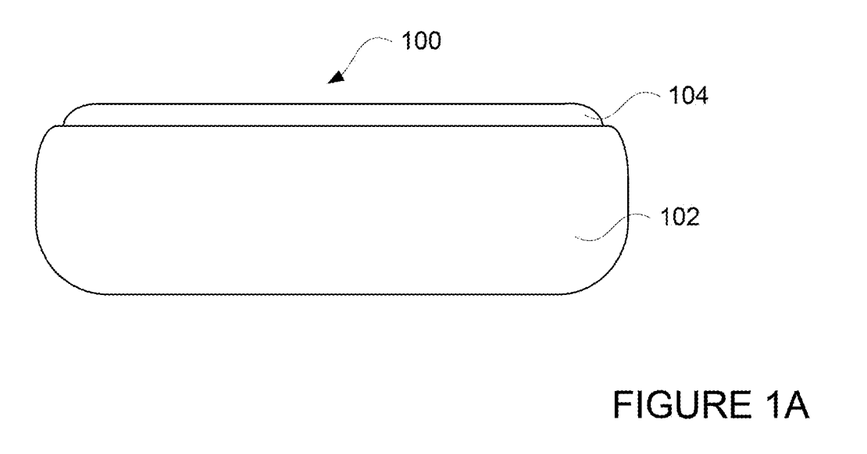
FIGS. 1A and 1B illustrate an example device in accordance with aspects of the disclosure.
Figure 1B:
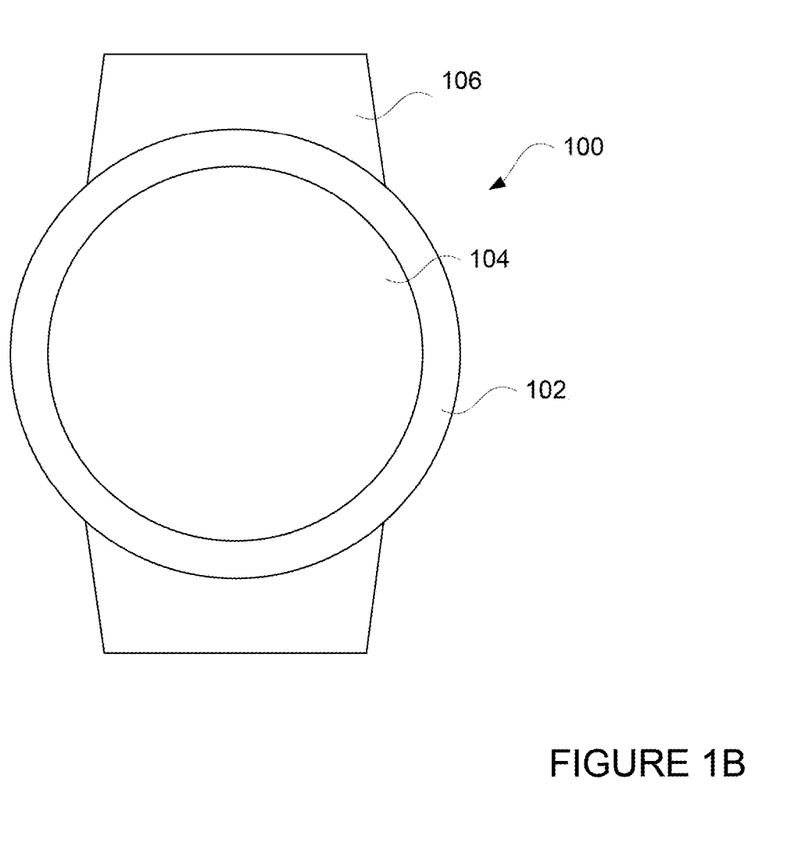

FIGS. 1A and 1B illustrate an example device 100 in which a display antenna may be provided. As shown, the example device 100 is a wearable device, in particular a smartwatch. However, it should be understood that a display antenna may be implemented in any of a variety of devices with a display, including both wearable and non-wearable devices, such as head-mounted devices, smartphones, tablets, laptops, televisions, etc. FIG. 1A shows a side view of an exterior of the device 100, and FIG. 1B shows a top view of an exterior of the device 100.

As shown in FIGS. 1A and 1B, the device 100 has a housing 102 and a display cover 104 attached to or mounted on the housing 102. The housing 102 may be configured to provide support and protection to various electronic, optical, and/or mechanical components of the device 100. The housing 102 may be made out of a variety of materials, such as metal, alloy, plastic, glass, ceramics, or any combination of these or other materials. In instances where the housing 102 is made of a conductive material such as metal, the housing 102 may be configured to provide grounding for one or more components of the device 100. The housing 102 may be any shape, such as round, rectangular, square, oval, etc. A top surface of the housing 102 may be configured to be attached to the display cover 104, such as by having an opening with a similar shape as the display cover 104, and structures such as bezels, mounts, etc. Where the device 100 is a wearable device, a bottom surface of the housing 102 opposite the display cover 104 may be configured to be in contact with skin or clothing, such as by having a generally flat or smooth surface.

The display cover 104 may be configured to protect and enable viewing of and interactions with a display underneath the display cover 104. As described in detail further below, the display may be a screen or a touch screen including various electronic, optical, and mechanical components. The display cover 104 may be made of any of a number of transparent materials. For example, the display cover 104 may be made of a dielectric material such as glass, polymers, etc. The display cover 104 may have a substantially planar shape, or have a three-dimensional shape with curvature, such as a dome-like shape. The display cover 104 may be configured to have a similar or different shape as the surface of the housing 102 to which the display cover 104 is attached. In this example shown, the display cover 104 has the similar round shape as the top surface of the housing 102 to which it is attached.

The housing 102 may further be adapted to modularly attach to other components. For example as shown, where the device 100 is a smartwatch, housing 102 may be adapted to attach to a watch band 106. The watch band 106 may be made of any appropriate material, including metal, ceramic, leather, polymers, fabric, or any combination of such materials. In instances where the watch band 106 is made of a conductive material such as metal, the watch band 106 may be configured to provide grounding for one or more components of the device 100.

Figure 2A:
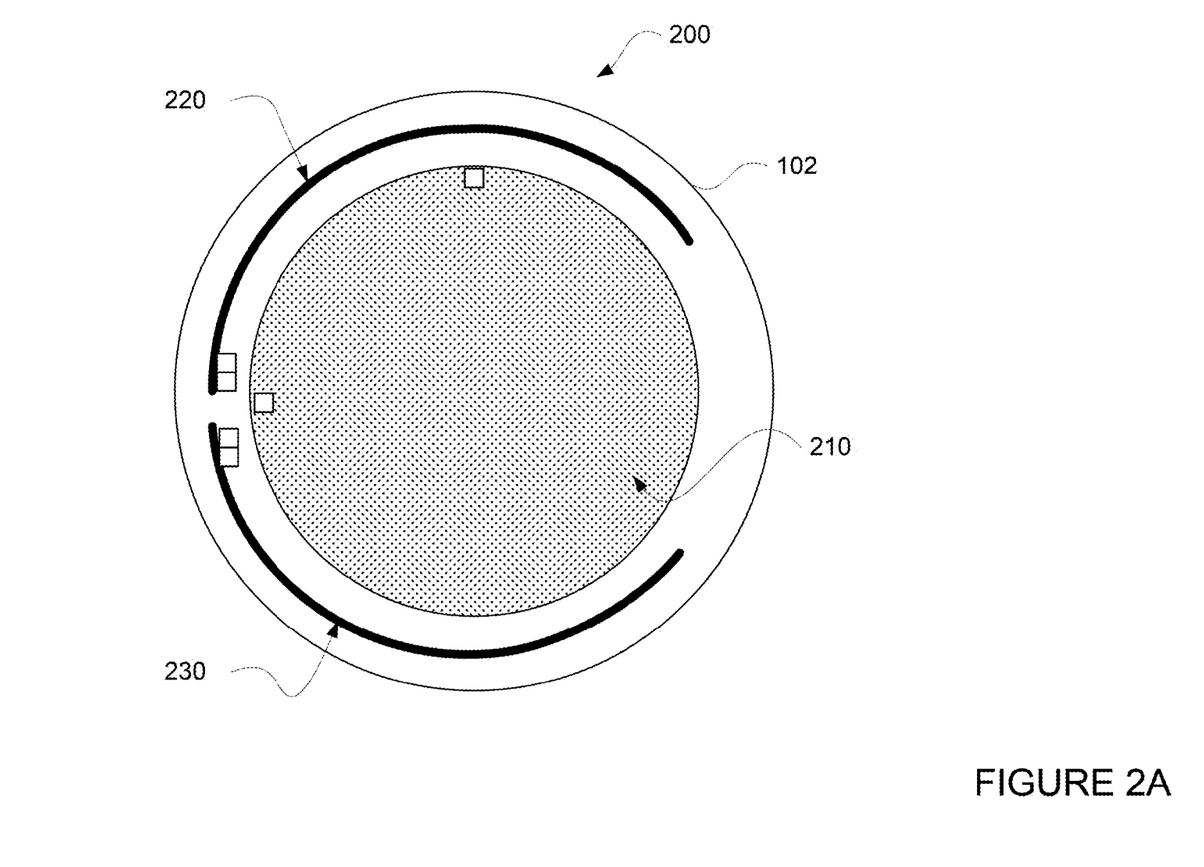
FIGS. 2A, 2B and 2C illustrate an example antenna system in accordance with aspects of the disclosure.
Figure 2B:
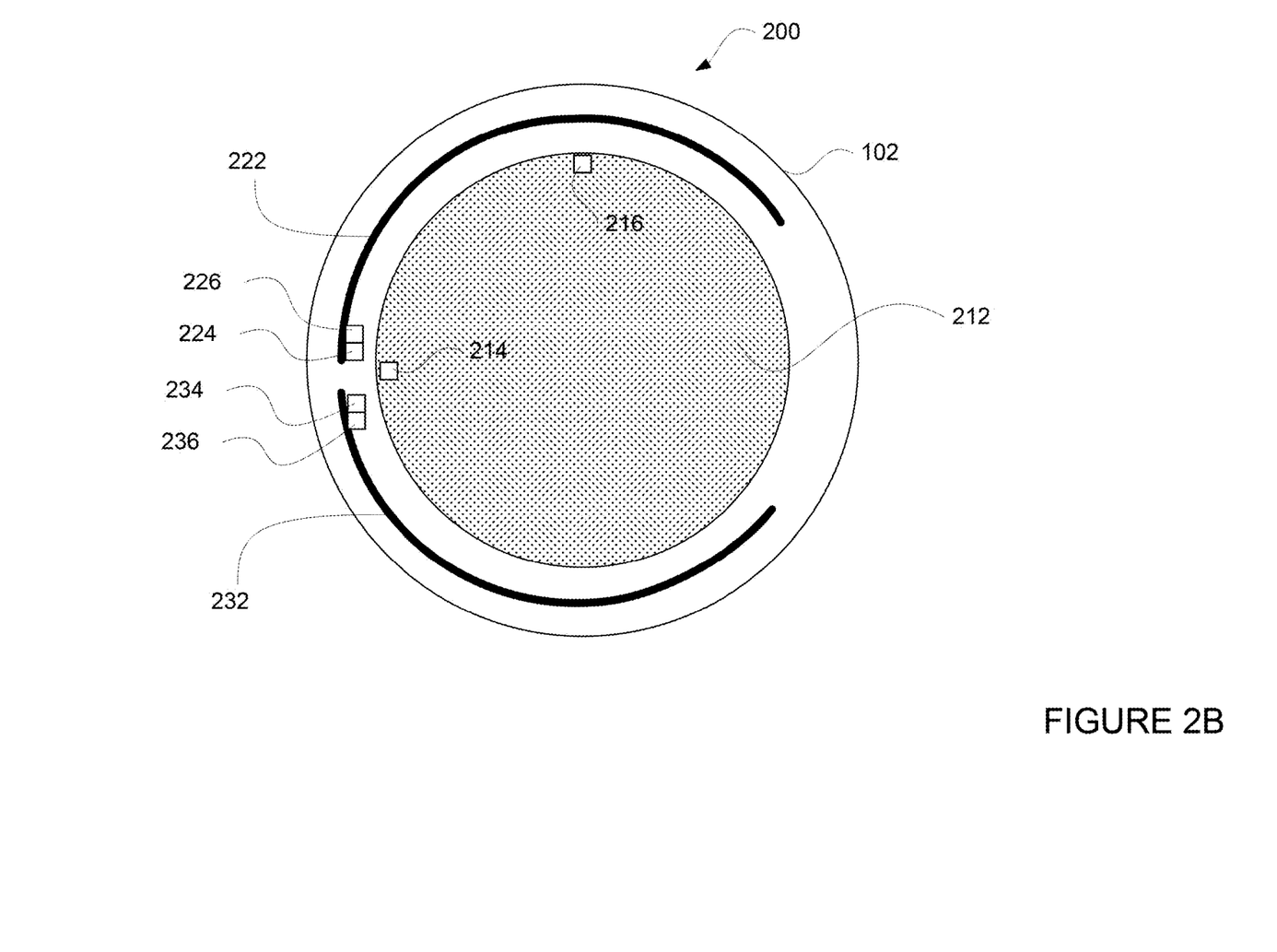
Figure 2C:
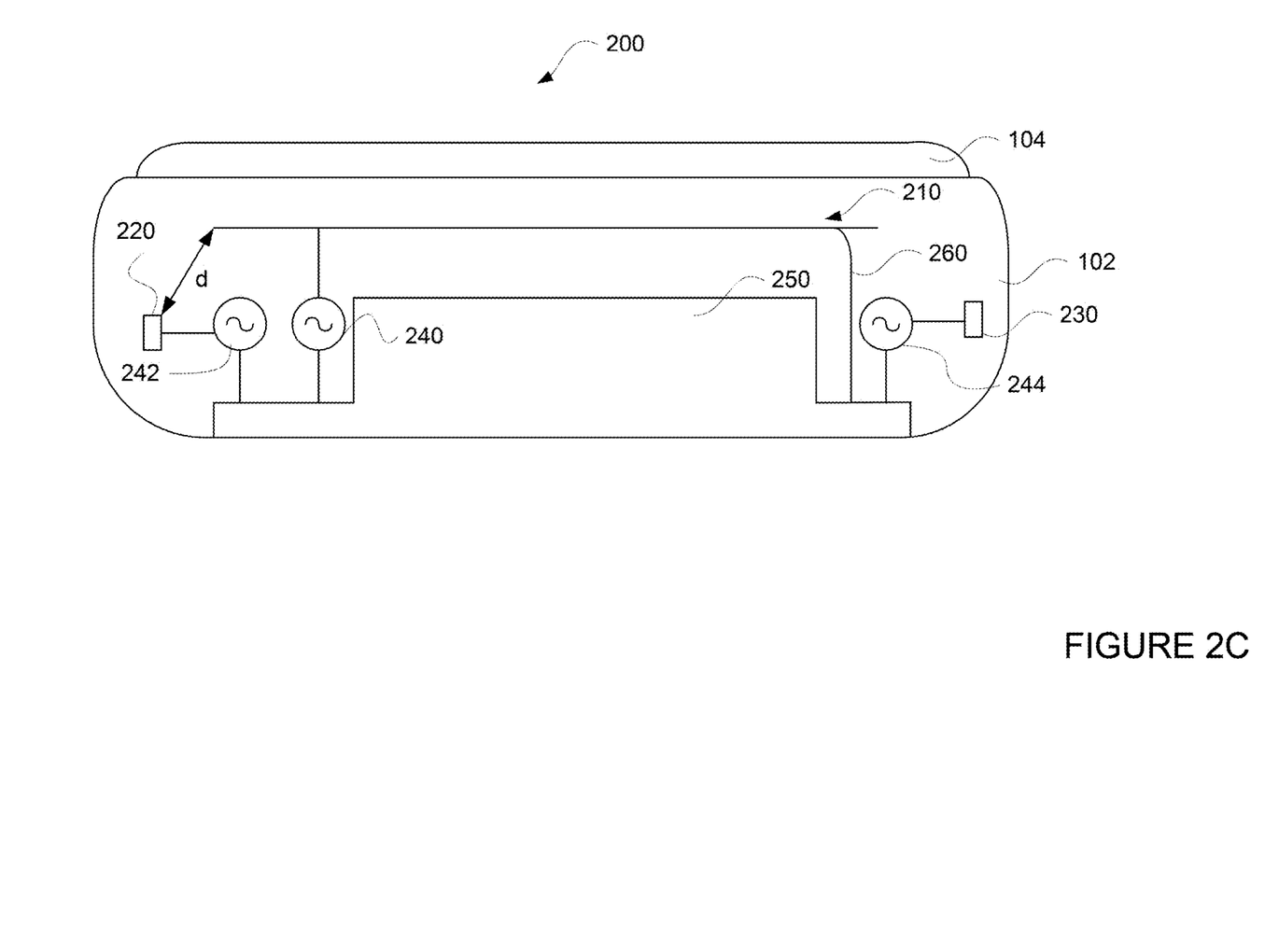

Device 100 may have an antenna system including one or more antennas for sending and/or receiving signals wirelessly. FIGS. 2A, 2B, and 2C illustrate an example antenna system 200 that may be provided in device 100. FIGS. 2A and 2B show a top view of a horizontal cross section of the device 100, exposing one view of the antenna system 200. FIG. 2C shows a side view of a vertical cross section of the device 100, exposing another view of the antenna system 200.

Referring to FIG. 2A, the antenna system 200 may include a first antenna 210, a second antenna 220, and a third antenna 230. The first antenna 210, the second antenna 220, and the third antenna 230 may be configured to operate around the same or different sets of resonant frequencies. By way of example only, the first antenna 210 may be configured to operate in LTE frequencies, including low-band LTE frequency range between 700 MHz and 960 MHz, mid-band LTE frequency range between 1710 MHz to 2200 MHz, and high-band LTE frequency range between 2500 MHz and 2700 MHz. The second antenna 220 may be configured to operate in frequency ranges of GNSS frequency bands, which may include GPS frequency band centered around 1575.42 MHz, GLONASS frequency band between 1596-1607 MHz, BeiDou frequency band centered around 1561.098 MHz. The third antenna 230 may be configured to operate in frequency ranges between 2400 MHz and 2484 MHz for WiFi and Bluetooth signals. As such, the antenna system 200 may provide coverage of LTE communication bands via the first antenna 210, coverage of GPS communication band via the second antenna 220, and coverage of WiFi and Bluetooth communication bands via the third antenna 230.

Referring to FIG. 2B, the first antenna 210 may be a display antenna such that the first antenna 210 includes one or more components from a display of the device 100. For example, one or more radiating elements 212 of the first antenna 210 may at least partially be formed by one or more components from a display of the device 100. Additionally or alternatively, the one or more radiating elements 212 of the first antenna 210 may at least partially be formed by a dedicated antenna layer. Radiating elements are conductive elements configured to support currents or fields that contribute directly to the radiation patterns of the antenna. In this regard, the one or more radiating elements 212 of the first antenna 210 may be made of any of a number of conductive materials, such as metals and alloys.

Figure 3A:
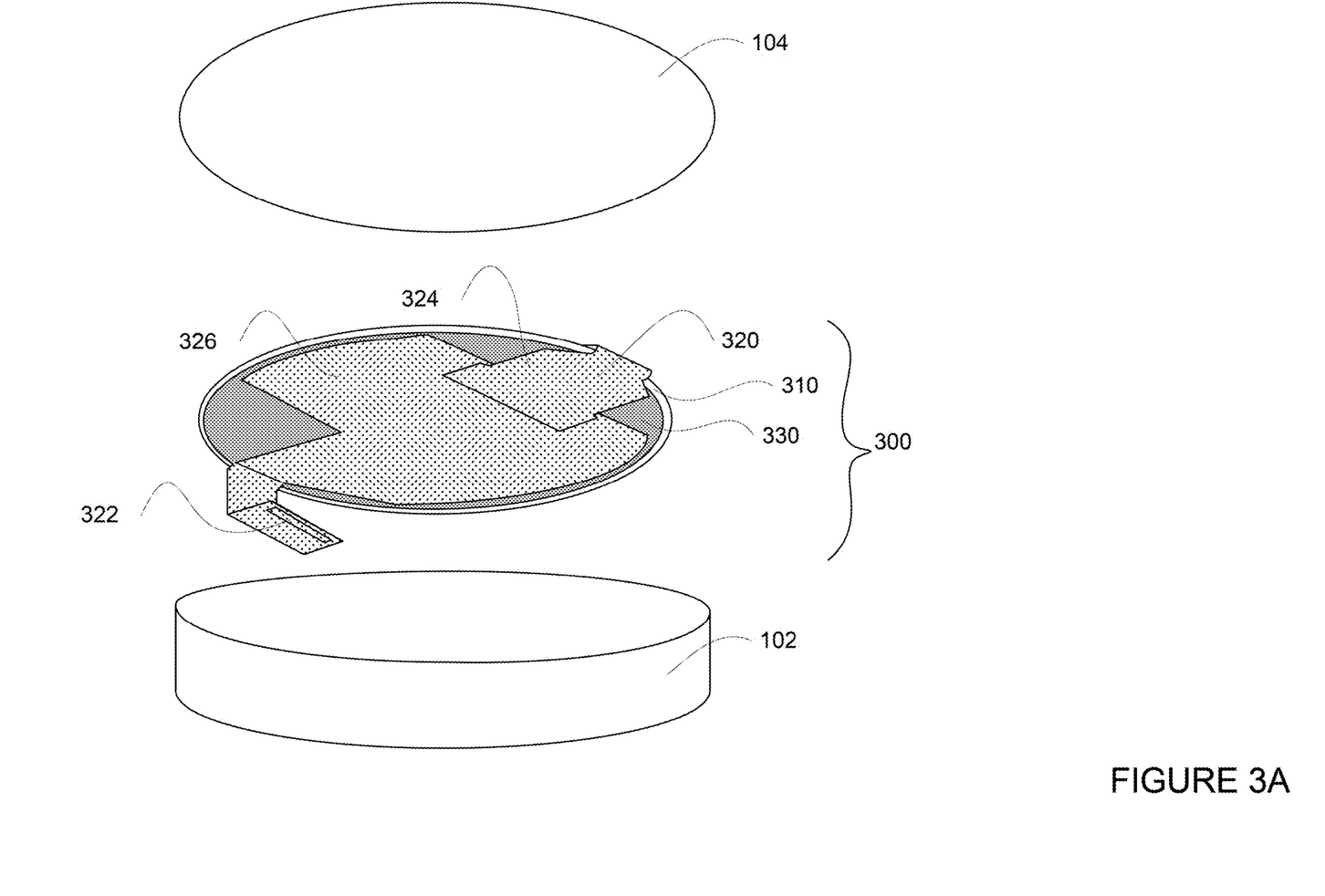
FIGS. 3A and 3B illustrate an example display antenna in accordance with aspects of the disclosure.
Figure 3B:
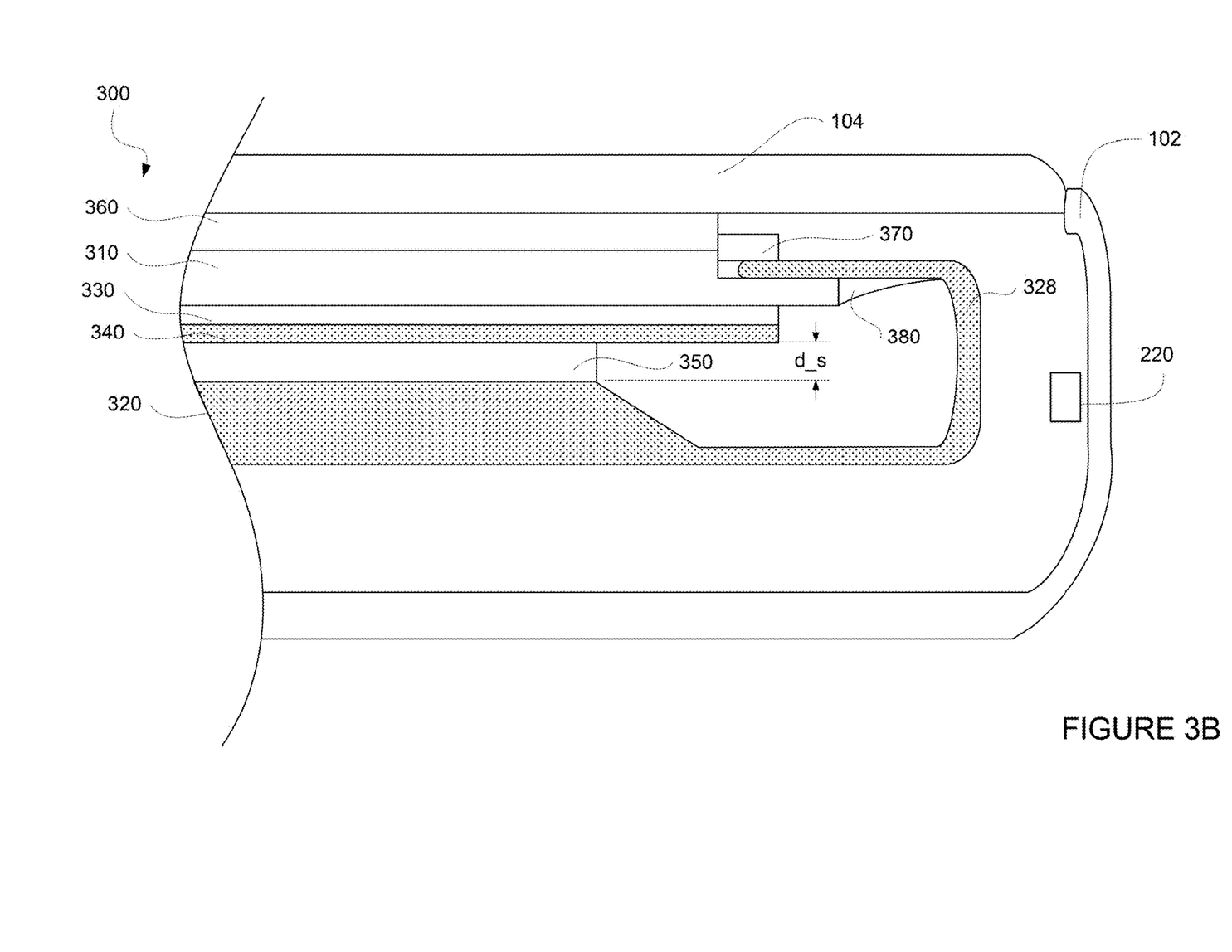

As shown in FIG. 2B, the first antenna 210 may be a planar antenna, where at least one of the radiating elements 212 is planar in shape. For example, the first antenna 210 is shown in FIG. 2B to have one or more planar radiating elements 212 (shown as shaded circle) with a similar round shape as the display cover 104. Alternatively, the one or more planar radiating elements 212 may have other shapes, such as rectangular, oval, square, etc. In instances where the first antenna 210 has multiple planar radiating elements, the multiple planar radiating elements may be arranged in a layered stack, such as in substantially parallel planes as shown in FIGS. 3A and 3B.

The first antenna 210 may have one or more feeds, such as feed 214. As shown in FIG. 2B, the feed 214 may be positioned along a perimeter of the planar radiating elements 212 of the first antenna 210. The feed 214 may be connected to transceivers and/or radio sources (not shown). For instance, the feed 214 may be configured to feed radio waves from a radio source, via a transmitter, to the rest of the antenna structure including the one or more planar radiating elements 212. The feed 214 may also be configured to collect incoming radio waves received at the one or more planar radiating elements 212, convert the incoming radio waves into to electric currents, and pass the electric currents to one or more receivers. In some examples, the first antenna 210 may be capacitively fed by a feed structure positioned proximate to the feed 214.

The first antenna 210 may have one or more ground connections, such as ground connection 216. As further shown in FIG. 2B, the ground connection 216 may be positioned along a perimeter of the planar radiating elements 212 of the first antenna 210. The ground connection 216 may connect or short the one or more planar radiating elements 212 of the first antenna 210 to a ground plane (not shown). A ground plane is a conducting surface that serves as a reflecting surface for radio waves received and/or transmitted by the radiating elements of an antenna. For example, the ground plane for the first antenna 210 may be formed by one or more conductive components of the device 100, such as housing 102, watch band 106, etc.

As further shown in FIG. 2A, the second antenna 220 and third antenna 230 may each be a semi-loop antenna. Further as shown in FIG. 2B, the second antenna 220 and the third antenna 230 may each include a radiating element 222, 232 having an arcuate shape (each shown as a bold line). The second antenna 220 and the third antenna 230 may each be positioned around a periphery of the first antenna 210 and curving along an inside surface of the housing 102. As another example, the second antenna 220 may include multiple radiating elements coupled to each other, such as two arcuate-shaped radiating elements capacitively coupled to each other (e.g., positioned within close proximity but separated by air or a dielectric material). The second antenna 220 and the third antenna 230 may each have a feed, such as feeds 224, 234 respectively, and a ground connection, such as ground connections 226, 236 respectively. The feeds 224, 234 and ground connections 226, 236 may each be positioned near an end of the respective radiating elements 222, 232.

Dimensions of the radiating elements 222 and 232 may be selected for supporting operation in different frequency ranges. For example, dimensions of the radiating element 222, such as length, may be selected for operation in GNSS frequency bands. For instance, the length may be selected so that the radiating element 222 has resonant frequencies in the GNSS frequency bands. Likewise, dimensions of the radiating element 232, such as length, may be selected for operation in WiFi and Bluetooth frequencies. For instance, the length may be selected so that the radiating element 232 has resonant frequencies in the WiFi and Bluetooth frequency bands.

Alternatively, the second antenna 220 and/or the third antenna 230 may be any other types of antenna, such as a monopole antenna, a dipole antenna, a planar antenna, a slot antenna, a hybrid antenna, a loop antenna, an inverted-F antenna, etc. As such, the radiating elements 222, 232 of the second antenna 220 and the third antenna 230 may have any other appropriate shape. For example, the radiating elements 222 and/or 232 may have a planar shape and positioned below the first antenna 210 near a bottom surface of the housing 102.

Referring to FIG. 2C, another view of the antenna system 200 illustrates relative positions of the first antenna 210, the second antenna 220, and the third antenna 230. Since the first antenna 210 may include one or more components of a display of the device 100, at least a portion of the first antenna 210 may be substantially parallel to a plane of the display cover 104. To reduce coupling effects, the first antenna 210, the second antenna 220, and the third antenna 230 may be positioned in the housing 102 such that there is at least a predetermined minimal separation 4 between the first antenna 210 and each of the second antenna 220 and the third antenna 230. For example as shown, the second antenna 220 and the third antenna 230 may be positioned around a periphery of the first antenna 210 and in a different plane as the first antenna 210.

FIG. 2C further shows the first antenna 210, the second antenna 220, and the third antenna 230 in relation to other components inside the housing 102. For instance, the first antenna 210, the second antenna 220, and/or the third antenna 230 may each be provided with a connection to one or more radio sources. FIG. 2C shows radio source 240 connected to the first antenna 210, radio source 242 connected to the second antenna 220, and radio source 244 connected to the third antenna 230. Although the radio sources 240, 242, 244 are shown as separate, in some cases they may be integrated, for example on a same chipset. The radio sources 240, 242, 244 may generate radio signals to be transmitted by the first antenna 210, the second antenna 220, and/or the third antenna 230. The radio source 240 may be connected to one or more antenna feeds, such as feeds 214, 224, 234.

The first antenna 210, the second antenna 220, and/or the third antenna 230 may be connected to one or more additional components 250 inside the housing 102. The additional components 250 may include any of the components shown in FIG. 6. For example, the additional components 250 may include one or more antenna control circuits provided on one or more circuit boards of the device 100. The first antenna 210, the second antenna 220, and/or the third antenna 230 may be provided with connections to components of the antenna control circuits, which may include the radio sources 240, 242, 244, transceivers, conducted ports, antenna tuners, etc. As another example, the additional components 250 may include conductive parts (such as a metal piece attached to a circuit board or the housing 102) making up the ground plane to which the first antenna 210, the second antenna 220, and the third antenna 230 may be connected.

Further, one or more flexes may provide connections between components of the device 100. The flex 260 may provide electrical connections for signal and power transmission between various components of the device 100, such as between display components, sensors, ground, processors or controllers, power sources, etc. For example as shown, the flex 260 may provide components of the display with electrical connections to the one or more processors of the device 100, a power source such as battery, sensor circuitry, ground, etc. In some instances, the one or more radiating elements 212 of the first antenna 210 may at least partially be formed by the flex 260.

As mentioned above, the first antenna 210 may be a display antenna including one or more components from the display of device 100. FIGS. 3A and 3B show components from an example display 300 that can be used as radiating elements of the first antenna 210 of device 100. FIG. 3A shows the device 100 in an exploded view, exposing the display 300. FIG. 3B shows a side view of a vertical cross section of the device 100, exposing a layered-stack arrangement of components in the display 300.

Referring to FIG. 3A, the display cover 104 is shown detached from the housing 102, exposing the example display 300 with various components. For example, components of the display 300 visible in FIG. 3A include a display panel 310, a display flex 320 with a mounting component 322, and a back cover tape 330. Although only a single display panel 310 is shown in FIG. 3A, any number of display panels may be included in a display.

The display panel 310 may be configured to generate graphics through illumination. In this regard, the display panel 310 may be made of a transparent material, such as glass, sapphire, or plastic. The display panel 310 may include an array of display pixels, which may be formed from a liquid-crystal display (LCD), light-emitting diodes (LEDs), organic light-emitting diodes (OLEDs), plasma cells, etc. In some instances, the display panel 310 may be two glass panels with an array of display pixels positioned in between. The display panel 310 may further include other materials, such as polarizing films, filters, etc. In some instances, the display panel 310 may further include sensors, such as touch sensors.

The display flex 320 (shown in grey) may provide electrical connections between components of the display 300, such as display panel 310, and other components of the device 100, such as processors and batteries of the device 100. The flex 260 of FIG. 2C may include display flex 320. To provide electrical connections, conductive wirings or traces may be embedded inside the display flex 320 or coated on one or more surfaces of the display flex 320. In instances where at least some components of the device 100 are provided on a circuit board (not shown), the display flex 320 may further include a mounting component 322, which may be configured to be coupled to connections on the circuit board. The mounting component 322 may be configured with any type of surface-mount technology (SMT), such as sockets, leads, solder, etc.

Further as shown, the display flex 320 may have planar portions 324, 326 with shapes that at least partially correspond to the planar shape of the display panel 310, thereby providing mechanical support to the display panel 310 when the display panel 310 are positioned on top of the display flex 320. The display flex 320 may be made of any material that can provide support or protection to the display panel 310 as well as insulation for electrical connections (wirings, metallic traces, etc.). For example, the display flex 320 may at least partially be made of a plastic or rubber material.

The display flex 320 may further include one or more conductive elements that form at least part of the one or more radiating elements 212 of the first antenna 210. For example, conductive elements of the display flex 320 for electrical connections, such as the wirings and/or traces described above, may form part of the one or more radiating elements 212. Such conductive elements may be located anywhere on the display flex 320, including the planar portions 324 and 326, forming part of the one or more radiating elements 212. Additionally or alternatively, other conductive materials, such as a metallic material coated on a surface of the display flex 320, may form part of the one or more radiating elements 212.

The back cover tape 330 (shown shaded in FIG. 3A) may be configured to affix the display panel 310 to the display flex 320. To provide more surface area for affixing, the back cover tape 330 may have a planar shape similar to the display panel 310 and/or the display flex 320. The back cover tape 330 may be made of any type of adhesive material, such as glue, epoxy, etc. Where needed, the back cover tape 330 may be made of a non-conductive material, such as polymers, which may provide insulation between the display panel 310, the display flex 320, and/or other components. Alternatively, the back cover tape 330 may at least partially be made of a conductive material, such as an epoxy including metallic materials.

As shown, the display panel 310, the display flex 320, and the back cover tape 330 may be arranged in a layered stack. FIG. 3B further illustrates this layered stack arrangement, along with additional example components as described further below. For example, these additional components may have a surface area equal or smaller than the display panel 310, the display flex 320, and the back cover tape 330 such that they are not visible in FIG. 3A. Further, some of these additional components, such as dedicated antenna layer 340, may in some instances be embedded or integrated into the back cover tape 330, and as such, may not be visible from the view of FIG. 3A. The arrangement shows at least some portions of each of the display panel 310, the display flex 320, and the back cover tape 330 positioned in substantially parallel planes.

FIG. 3B further shows a dedicated antenna layer 340 positioned between the display panel 310 and the display flex 320. The dedicated antenna layer 340 may be a discrete layer configured to form at least part of the one or more radiating elements 212 of the first antenna 210. Alternatively, the dedicated antenna layer 340 may be embedded into the back cover tape 330, for example forming a multi-layer conductive back cover tape. In this regard, the dedicated antenna layer 340 may be made of any of a number of conductive materials, such as metals and alloys, for example copper, aluminum, iron, etc. As shown, the dedicated antenna layer 340 is planar in shape. For example, the dedicated antenna layer 340 may have a similar shape as the display panel 310, the display flex 320, and/or the display cover 104. Such a configuration may further increase surface area of the one or more radiating elements 212, which may improve antenna performance. The dedicated antenna layer 340 may be positioned in a plane substantially parallel to the display panel 310 and/or the display flex 320.

In some examples, the dedicated antenna layer 340 and one or more conductive elements of the display flex 320 may form one radiating element of the first antenna 210. For instance, the dedicated antenna layer 340 and conductive elements of the display flex 320 may be capacitively coupled to each other. In this regard, the dedicated antenna layer 340 and the conductive elements of the display flex 320 may be positioned in substantially parallel planes separated by a relatively small distance, such as by a predetermined separation distance $d\_s$. This separation distance $d\_s$ may be selected for certain antenna characteristics, such as coupling capacitance between the dedicated antenna layer 340 and the display flex 320, which may for example change impedance and/or resonant frequencies of the antenna 210.

In examples where the dedicated antenna layer 340 is embedded in the back cover tape 330 or coated onto the top side of the back cover tape 330 (i.e., opposite side as shown in FIG. 3B), the back cover tape 330 may provide the separation distance. The dielectric portions of the display flex 320 may also provide separation distance between the conductive elements of the display flex 320 and the dedicated antenna layer 340. Additionally or alternatively, the display flex 320 may further include a separation layer 350 that provides greater separation distance between at least some portions of the dedicated antenna layer 340 and the display flex 320. For example, certain circuit elements on some portions of the display flex 320 may require greater separation from the dedicated antenna layer 340, which may be provided by the separation layer 350. The separation layer 350 may be made of a dielectric material. The separation layer 350 may include adhesive material that affixes the dedicated antenna layer 340 to the display flex 320.

In other examples, some portions of the dedicated antenna layer 340 and some conductive elements of the display flex 320, such as a conductive coating on the display flex 320, may be positioned in direct contact with each other. Thus, in such cases some portions of the dedicated antenna layer 340 may be capacitively coupled to some conductive elements of the display flex 320, while other portions of the dedicated antenna layer 340 may be in direct contact with some conductive elements of the display flex 320.

Although FIG. 3B shows one example arrangement of the display flex 320 and the dedicated antenna layer 340, in other examples the display flex 320 and the dedicated antenna layer 340 may be arranged differently. For instance, the dedicated antenna layer 340 may be positioned below a bottom surface of the display flex 320. Alternatively, the dedicated antenna layer 340 may be positioned between the display panel 310 and the back cover tape 330.

The display 300 may include additional components. For example, the display 300 may include optical components filtering light, such as a polarizer 360. Where the display 300 is a touch screen, the display 300 may further include one or more touch sensors (not shown here, shown in FIG. 6) for detecting touch inputs. Examples of touch sensors may be capacitive sensors, optical sensors, force sensors, etc. Further as shown, the display flex 320 may have a fold-over portion 328 that is affixed to the display panel 310 by adhesives 370 and 380, the fold-over portion 328 may also include wiring and/or traces.

Conductive elements in other components of the display 300 may also form part of the one or more radiating elements 212 of the first antenna 210. For example, conductive elements of the display panel 310, such as parts of the display array and/or parts of the touch sensors, may form part of the one or more radiating elements 212 of the first antenna 210. As another example, where adhesives, such as back cover tape 330 or adhesives 370 and 380, include conductive materials, the conductive materials in these adhesives may also form part of the one or more radiating elements 212 of the first antenna 210.

The first antenna 210 may be positioned to allow dielectric loading. An antenna is dielectrically loaded when radio waves are received by radiating elements of an antenna through a dielectric material. Since a dielectrically loaded antenna may achieve the same electrical length as a non-dielectrically loaded antenna, but with a reduced physical size, dielectric loading may be beneficial for antennas in a small factor device. In the example shown in FIG. 3B, by forming radiating elements 212 near the display cover 104 and the display panel 310, the first antenna 210 may be dielectrically loaded through the display cover 104 and/or the display panel 310. Where other components are also made of dielectric materials, such as the polarizer 360 and the back cover tape 330, these other components may also dielectrically load the first antenna 210.

Further, by positioning the first antenna 210 to be relatively closer to the display cover 104 than the bottom surface of the housing 102 that is often in contact with the body of a user, body effects on the first antenna 210 may be reduced. Examples of body effects include shadowing (e.g., blocked from signals), detuning (e.g. changing frequency), and attenuation (e.g., reducing amplitude of signals). Positioning the first antenna 210 relatively farther away from the bottom surface of the housing 102 may also reduce exposure of the user's body to RF radiation.

Aspects of the dedicated antenna layer 340 may be adjusted to change one or more characteristics of the first antenna 210. For instance, unlike components such as the display flex 320 that is configured to perform other functions in addition to forming at least part of the one or more radiating elements 212, the dedicated antenna layer 340 is dedicated to perform only one function—forming at least part of the one or more radiating elements 212. Thus, while adjustments to components such as display flex 320 may be constrained by requirements for performing other functions, greater ranges and types of adjustments may be made to the dedicated antenna layer 340, without impacting functions of the display.

As an example, dimensions and materials of the dedicated antenna layer 340 may be adjusted to compensate for radiofrequency (RF) loss, which may occur when radio waves reach other components of the device 100, including the display cover 104, the display panel 310, and the display flex 320. For example, the dedicated antenna layer 340 may be adjusted to any arbitrary shape (e.g., square, circle, square, polygon, different diameters/lengths, etc.) within the confines of the housing 102 in order to achieve certain resonant frequencies and/or impedance values. As another example, different materials (including combinations of materials) may be used for the dedicated antenna layer 340 to change characteristics of the antenna 210 such as conductivity, resonant frequency, impedance, etc.

Aspects of other components shown in FIG. 3B may also be adjusted to change one or more characteristics of the first antenna 210. For example, where a conductive element (such as conductive coating) is added to the display flex 320 to form part of the one or more radiating elements 212, dimensions and materials of that conductive element may be adjusted to reduce RF loss at the display flex 320. As another example, shapes and dimensions of the display flex 320, including planar portions 324 and 326, may be adjusted to change characteristics of the antenna 210. For instance, slot cut, flex bending, etc. may be added to the display flex 320.

Further, dimensions and materials of the separation layer 350 may also be adjusted to reduce RF loss at the separation layer 350.

Figure 4:
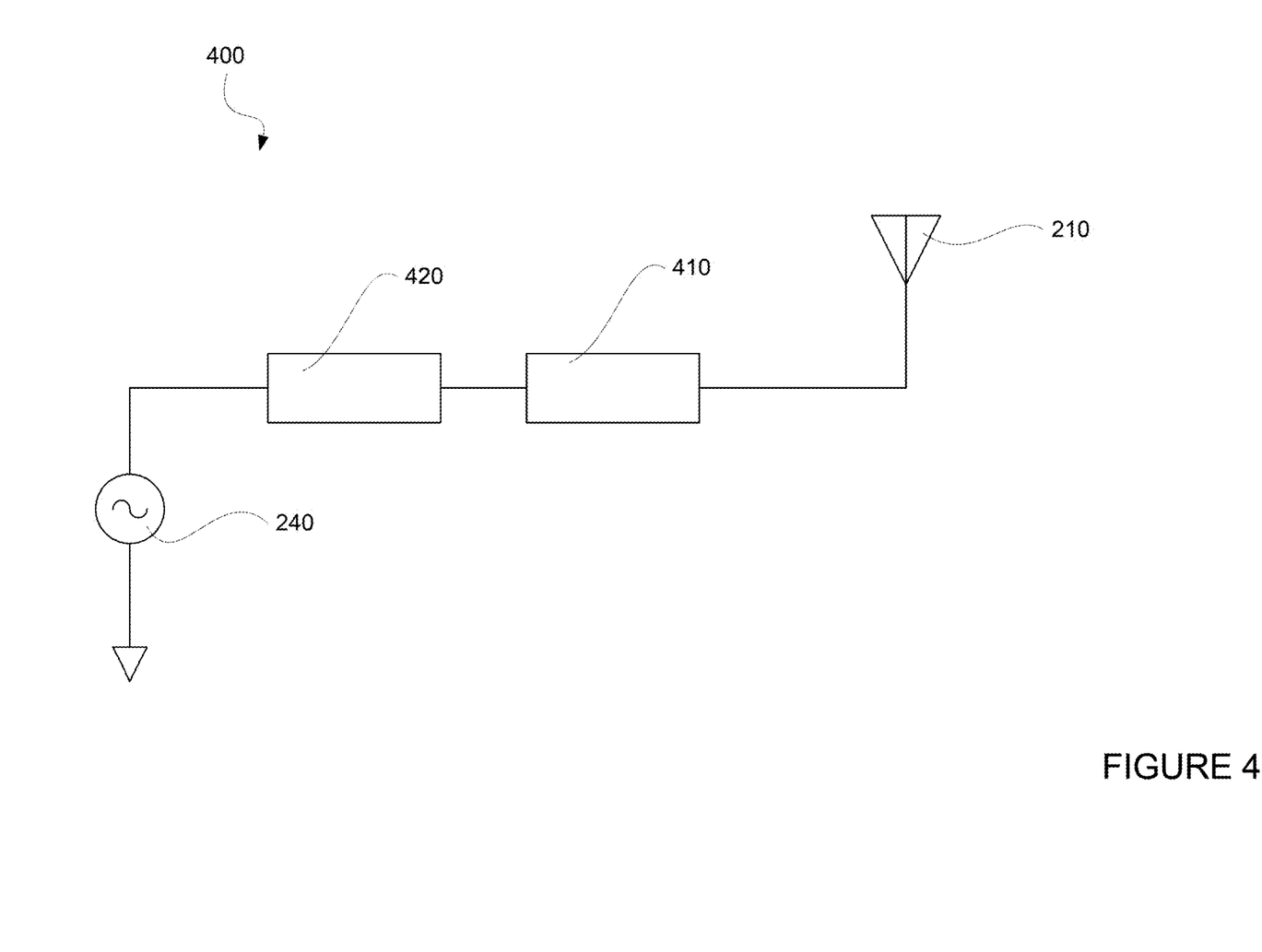
FIG. 4 illustrates an example circuit diagram for an example display antenna in accordance with aspects of the disclosure.

FIG. 4 shows an example circuit 400 for a display antenna, such as the first antenna 210. The circuit 400 may also be used for other types of antennas, such as the second antenna 220 and the third antenna 230. As shown, the first antenna 210 is connected to the radio source 240, for example at feed 214 (not shown). Between the radio source 240 and the first antenna 210, one or more tuners 410 may be connected to the feed 214. For example, the one or more tuners 410 may include an impedance tuner and/or an aperture tuner. An aperture tuner is configured to change an aperture size of one or more radiating elements of an antenna, which affects a resonant frequency of the antenna. An impedance tuner is configured to change an impedance of one or more radiating elements of an antenna, which also affects a resonant frequency of the antenna.

In some instances, the one or more tuners 410 may include multiple tuners, such as a first tuner that selects a resonant frequency of the first antenna 210 within a communication band, and a second tuner that fine tunes within the selected communication band. Additionally, a pre-matching circuit (not shown) may be connected to the one or more tuners 410 to customize the one or more tuners 410 as needed. The one or more tuners 410 may improve frequency match, antenna efficiency, and reduce specific absorption rate.

Figure 6:
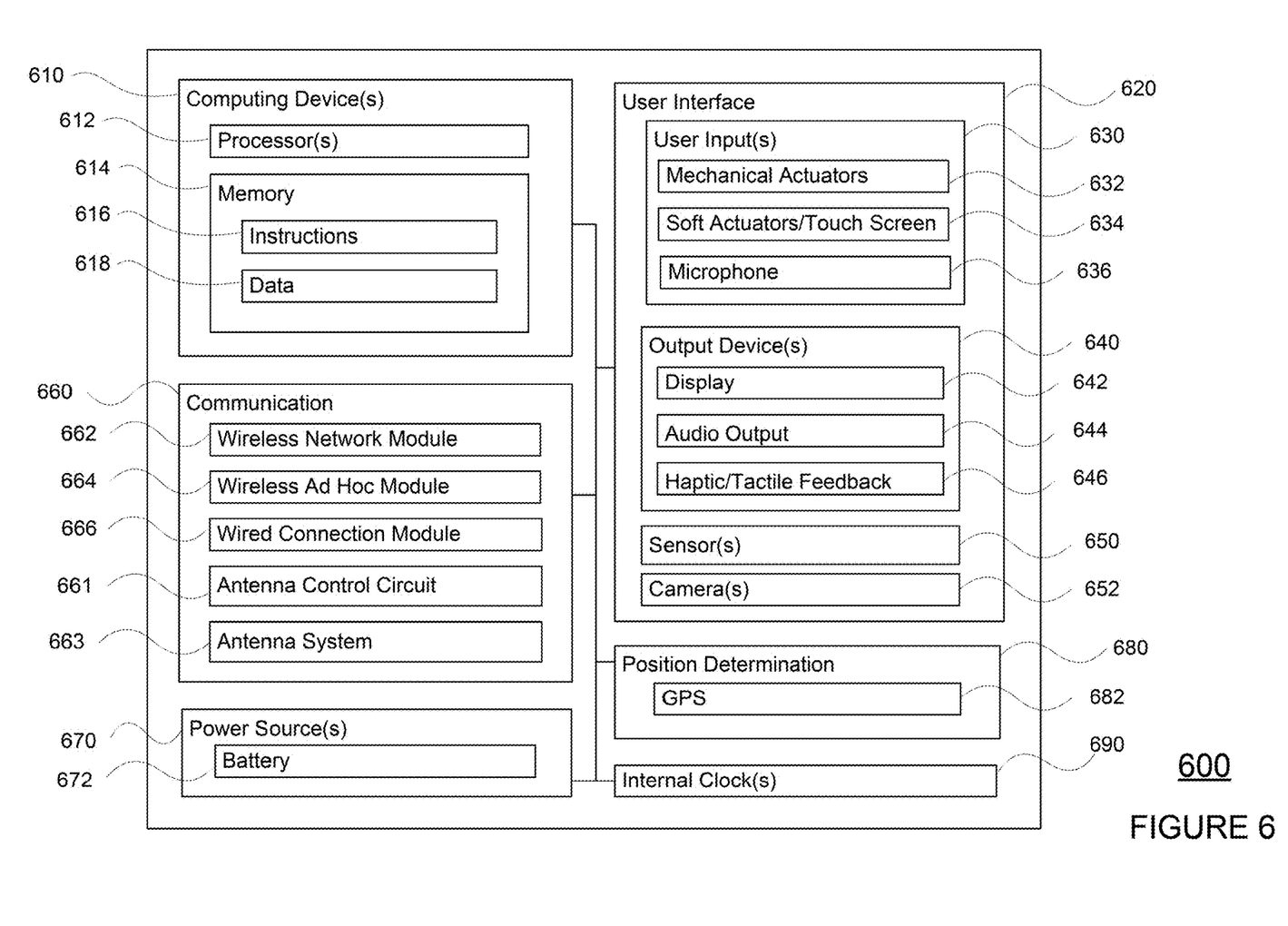
FIG. 6 is a block diagram illustrating an example system in accordance with aspects of the disclosure.

The one or more tuners 410 may be active tuners controlled by the antenna control circuit (not shown in FIG. 4, shown as 661 in FIG. 6). In this regard, the one or more tuners 410 may tune between different communication bands based on any of a number of network requirements, such as signal strength and user traffic. For example, the one or more tuners 410 may be configured such that, when signal strength drops below a low quality threshold for the LTE band that the first antenna 210 is currently tuned to, the one or more tuners 410 may change an aperture size and/or an impedance of the radiating elements of the first antenna 210 to change its resonant frequency (changing tuning state), and to fine tune within that range.

Additionally, a matching network 420 may be connected to the first antenna 210. A matching network is an impedance transforming circuitry that ensures proper impedance matching by transforming either or both impedances of a radio source and a load. The matching network 420 may include components such as inductors and capacitors. For instance, the matching network 420 may increase or decrease impedance of the radio source 240 to match an impedance of the first antenna 210. Alternatively or additionally, the matching network 420 may increase or decrease impedance of the first antenna 210—the load—to match an impedance of the radio source 240.

Figure 5:
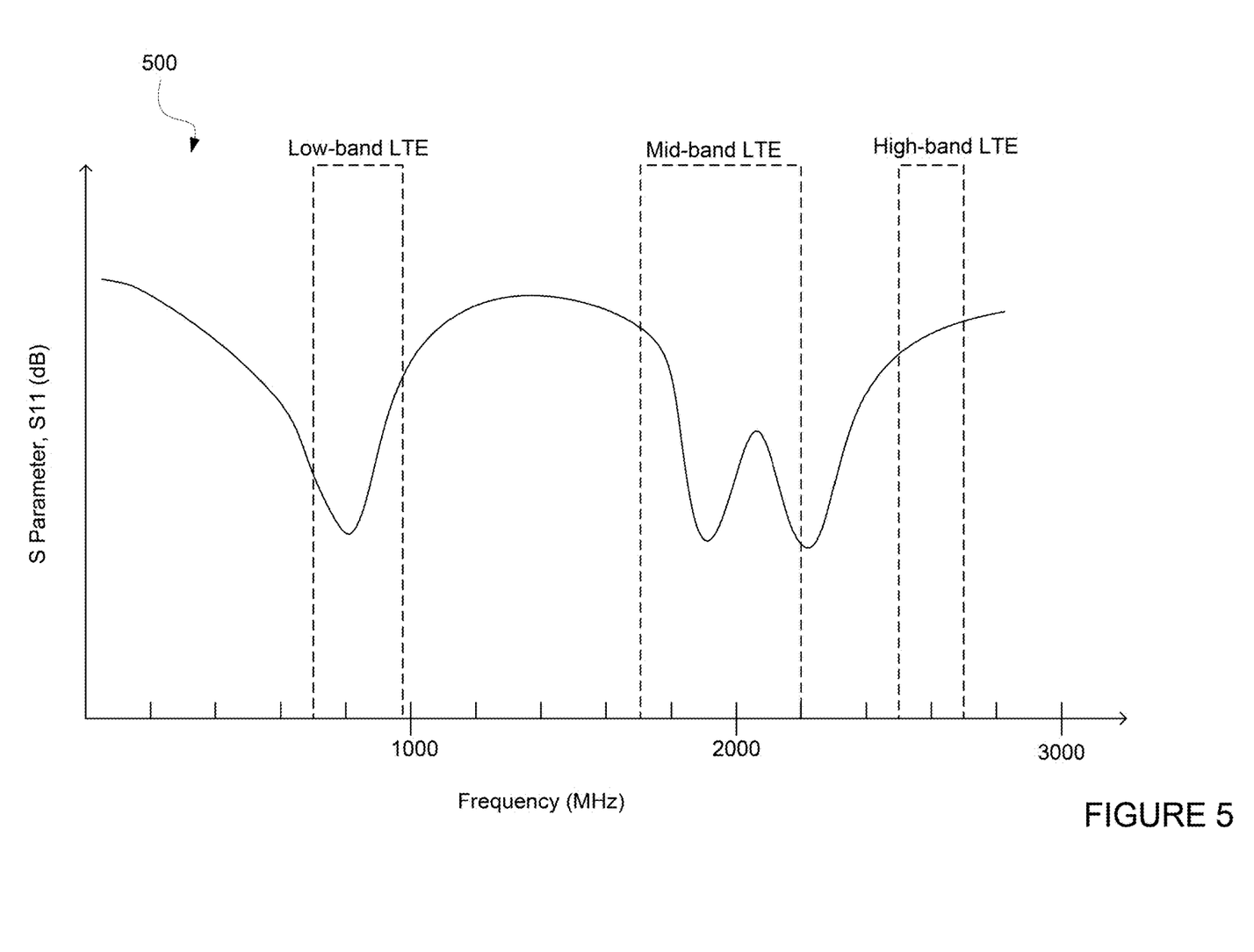
FIG. 5 is a graph showing example performances of a display antenna in accordance with aspects of the disclosure.

FIG. 5 shows an example performance graph of a display antenna, such as the first antenna 210. Graph 500 plots s parameter for LTE frequency ranges. The s parameter for an antenna describes the relationship between the input and reflected or pass-through power of the antenna. Here, the s parameter plotted is S11, which is the return loss of the antenna. The first antenna 210 is shown to be tuned one tuning state, which supports operation about three frequency ranges represented by the three different troughs. For example, the first antenna 210 may be tuned by the circuit 400. As shown, the first trough covers frequencies in the low-band LTE frequency range, the second and third troughs cover frequencies in the mid-band LTE frequency range. Although not shown here, the first antenna 210 may be turned to additional tuning state(s) in order to support operation in additional frequency ranges, such as high-band LTE frequency range.

FIG. 6 shows an example system 600 in accordance with aspects of the disclosure. The example system 600 may be included as part of the device 100. The system 600 has one or more computing devices, such as computing device(s) 610 containing one or more processor(s) 612, memory 614 and other components typically present in a personal computing device. The one or more processor(s) 612 may be processors such as commercially available CPUs. Alternatively, the one or more processors may be a dedicated device such as an ASIC, a single or multi-core controller, or other hardware-based processor.

The memory 614 stores information accessible by the one or more processor(s) 612, including instructions 616 and data 618 that may be executed or otherwise used by processor(s) 612. The memory 614 may be, e.g., a solid state memory or other type of non-transitory memory capable of storing information accessible by the processor(s), including write-capable and/or read-only memories.

The instructions 616 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in detail below.

User interface 620 may include user input(s) 630 and output device(s) 640. For instance, user input(s) 630 may include mechanical actuators 632, soft actuators 634, and microphone 636. The mechanical actuators 632 may include a crown, buttons, switches and other components. The soft actuators 634 may be incorporated into a touchscreen. For example, touch sensors may be incorporated in the display cover 104, or components of the display 300, such as display panel 310.

The output device(s) 640 may include a user display 642, audio output 644, and haptic or tactile feedback 646. For example, the user display 642 may be a screen or a touch screen for displaying information to the user, and may include components in the display 300. The audio outputs 644 may include components such as speakers, transducers, etc. The haptic interface or other tactile feedback 646 may components such as haptic motors for providing non-visual and non-audible information to the wearer.

The user interface 620 may include additional components as well. By way of example, one or more sensor(s) 650 may be located on or within the housing 102. For example, touch sensors may be incorporated into the display 300. The sensor(s) 650 may also include an accelerometer, e.g., a 3-axis accelerometer, a gyroscope, a magnetometer, a barometric pressure sensor, an ambient temperature sensor, etc. Additional or different sensors may also be employed. The user interface 620 may also include one or more camera(s) 652. For example the camera(s) 652 may be incorporated into the user display 642.

To obtain information from and send information to remote devices, the system 600 may include a communication subsystem 660 having a wireless network connection module 662, a wireless ad hoc connection module 664, and/or a wired connection module 666. The wireless network connection module 662 may be configured to support communication via cellular, LTE, 4G, WiFi, GPS, and other networked architectures. The wireless ad hoc connection module 664 may be configured to support Bluetooth®, Bluetooth LE, near field communications, and other wireless arrangements. And the wired connection module 666 may include a USB, micro USB, USB type C or other connector, for example to receive data and/or power from a laptop, tablet, smartphone or other device.

The communication subsystem 660 may include one or more antenna control circuits 661, which controls an antenna system 663. For example, the antenna system 663 may be the antenna system 200. The antenna control circuit 661 may control the feeding of the first antenna 210, the second antenna 220, and/or the third antenna 230 of the antenna system 200. The antenna control circuit 661 may further control tuning of the first antennas 210, the second antenna 220, and/or the third antenna 230, such as impedance tuners, aperture tuners, and or matching networks. While not shown, the communication subsystem 660 has a baseband section for processing data and a transceiver section for transmitting data to and receiving data from remote devices. The transceivers may operate at RF frequencies via one or more antennae, such as the first antenna 210, the second antenna 220, and/or the third antenna 230.

The system 600 includes one or more power source(s) 670 that provide power to the various components of the system. The power source(s) 670 may include a battery, such as battery 672, winding mechanism, solar cell or combination thereof. The computing devices may be operatively couples to the other subsystems and components via a wired bus or other link, including wireless links.

The system 600 also includes a position determination module 680, which may include a GPS chipset 682 or other positioning system components. Information from the sensor(s) 650 and/or from data received or determined from remote devices (e.g., wireless base stations or wireless access points), can be employed by the position determination module 680 to calculate or otherwise estimate the physical location of the system 600.

The system 600 includes one or more internal clock(s) 690 that provide timing information, which can be used for time measurement for apps and other programs run by the smartwatch, and basic operations by the computing device(s) 610, GPS 682, and communication subsystem 660.

The display antenna and antenna system as described above provide for efficient operation of devices, particularly for small factor wearable electronic devices. Features of the display antenna provide for using conductive components that already exist in a display for forming antenna radiating elements, therefore saving limited space in small factor devices. A dedicated antenna layer in the display antenna provides flexibility for both antenna design and device design, for example, adjustments can be made to the dedicated antenna layer to change characteristics of the display antenna, instead of compromising dimensions and/or materials used in the display. The display antenna may be positioned to allow dielectric loading by dielectric components that already exist in the display, which may further improve antenna performance by effectively increasing the display antenna's electrical length without increasing its physical length. Features of the display antenna also provide for reduced coupling with other antennas, greater isolation from the body effects of the user, and reduced exposure of a user's body to RF radiation.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An antenna, comprising:
a plurality of radiating elements, comprising:
one or more components of a display of a device, the one or more components of the display including one or more conductive elements; and
a dedicated antenna layer positioned in the display of the device, wherein each of the one or more conductive elements are capacitively coupled to and separated from the dedicated antenna layer according to a respective separation distance, wherein the respective separation distance for the conductive element is based on antenna characteristics for the antenna;
wherein the plurality of radiating elements are configured to receive and/or transmit radio frequency waves.

2. The antenna of claim 1, further comprising: at least one separation layer positioned between the one or more components and the dedicated antenna layer such that the one or more conductive elements and the dedicated antenna layer are capacitively coupled through the at least one separation layer.

3. The antenna of claim 2, wherein the at least one separation layer includes an adhesive layer.

4. The antenna of claim 2, wherein the thickness of the at least one separation layer between each of the one or more conductive elements and the dedicated antenna layer is the respective separation distance for the conductive element.

5. The antenna of claim 1, further comprising: one or more tuners configured to change a resonant frequency of the antenna.

6. The antenna of claim 1, further comprising: one or more matching networks configured to change an impedance of a radio source or a load of the antenna.

7. The antenna of claim 1,
wherein the antenna characteristics comprise a respective coupling capacitance between the dedicated antenna layer and each conductive element, and
wherein the respective separation distance for each of the one or more conductive elements is based on the respective capacitance between the dedicated antenna layer and the conductive element.

8. A device, comprising:
a display;
a first antenna, the first antenna comprising a plurality of radiating elements, the plurality of radiating elements comprising:
one or more components of the display, the one or more components of the display including one or more conductive elements; and
a dedicated antenna layer positioned in the display, wherein each of the one or more conductive elements are capacitively coupled to and separated from the dedicated antenna layer according to a respective separation distance, wherein the respective separation distance for the conductive element is based on antenna characteristics for the antenna;
wherein the plurality of radiating elements are configured to receive and/or transmit radio frequency waves.

9. The device of claim 8, wherein the one or more components of the display include a display flex that provides electrical connections between the display to other components of the device.

10. The device of claim 9, wherein the one or more conductive elements include the electrical connections of the display flex.

11. The device of claim 9, wherein the one or more conductive elements include a conductive coating on the display flex.

12. The device of claim 8, wherein the dedicated antenna layer is embedded in an adhesive layer in the display.

13. The device of claim 8, further comprising: at least one separation layer positioned between the one or more components and the dedicated antenna layer such that the one or more conductive elements and the dedicated antenna layer are capacitively coupled through the at least one separation layer.

14. The device of claim 13, wherein the separation layer is an adhesive affixing the dedicated antenna layer to the one or more components of the display.

15. The device of claim 8, further comprising: a display cover, the display cover being made of a dielectric material configured to dielectrically load the first antenna.

16. The device of claim 8, further comprising: one or more display panels, the one or more display panels being made of a dielectric material configured to dielectrically load the first antenna.

17. The device of claim 8, further comprising:
a housing, the housing is made of a conductive material;
a ground connection between the first antenna and the housing.

18. The device of claim 8, further comprising: a second antenna, the second antenna positioned along a periphery of a housing of the device, wherein the second antenna is configured to receive and/or transmit radio frequency waves in frequency ranges for GPS signals.

19. The device of claim 18, further comprising: a third antenna, the third antenna positioned along a periphery of a housing of the device, wherein the third antenna is configured to receive and/or transmit radio frequency waves in frequency ranges for WiFi and Bluetooth signals.

20. A system, comprising:
a first antenna, the first antenna comprising:
a plurality of radiating elements, the plurality of radiating elements comprising:
one or more components of a display of a device, the one or more components of the display including one or more conductive elements; and
a dedicated antenna layer positioned in the display of the device, wherein each of the one or more conductive elements are capacitively coupled to and separated from the dedicated antenna layer according to a respective separation distance that is based on antenna characteristics for the antenna;
wherein the first antenna is configured to receive and/or transmit radio frequency waves in frequency ranges for LTE signals;
a second antenna positioned along a periphery of a housing of the device, the second antenna being configured to receive and/or transmit radio frequency waves in frequency ranges for GPS signals; and a third antenna positioned along the periphery of the housing of the device, the third antenna being configured to receive and/or transmit radio frequency waves in frequency ranges for WiFi and Bluetooth signals.

\* \* \* \* \*